March 24, 1931. P. L. HOLLOWAY 1,797,470
VEHICLE TOW DEVICE
Filed May 20, 1930 2 Sheets-Sheet 2
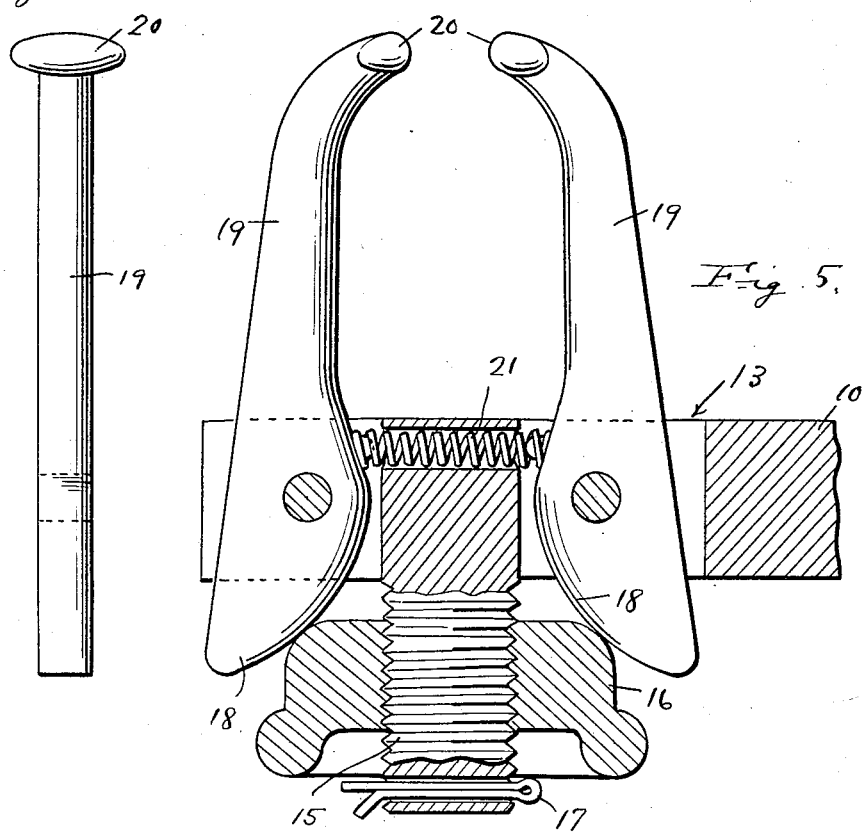
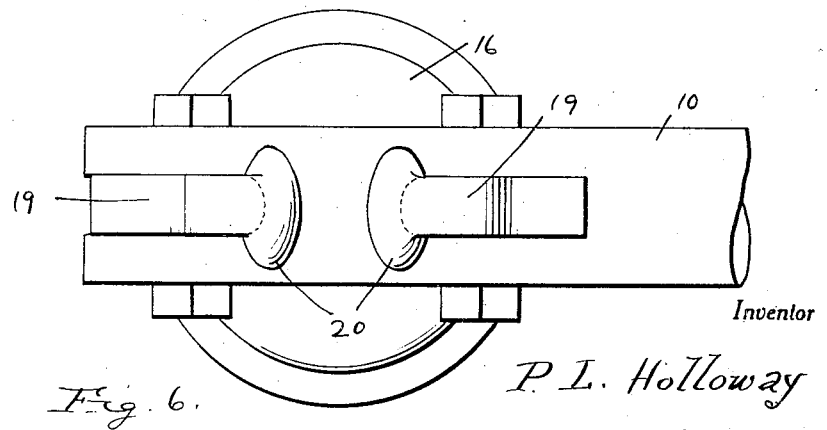
Inventor
P. L. Holloway
By Clarence A. O'Brien
Attorney Patented Mar. 24, 1931

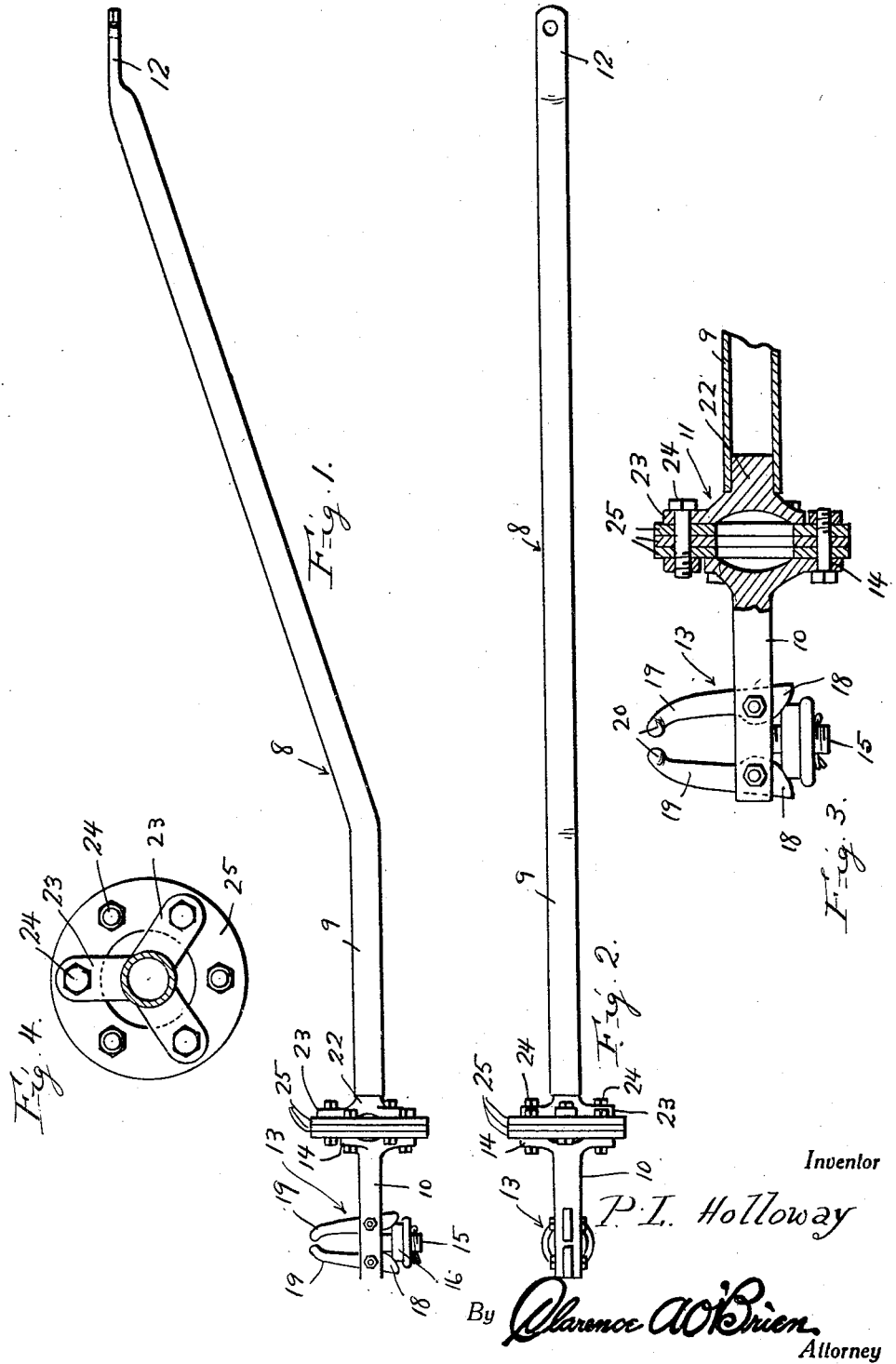

1,797,470

UNITED STATES PATENT OFFICE

PERLE LEE HOLLOWAY, OF BOULDER, COLORADO

VEHICLE TOW DEVICE

Application filed May 20, 1930. Serial No. 454,057.

This invention relates to a device or appliance which is especially constructed for coupling two vehicles together in a manner to provide a dependable and effective draft connection therebetween, such as is required, for example, between a lead or power supply vehicle and a trailer, or between the former and another power vehicle, the power supply of which is temporarily unavailable.

Briefly stated, the device is structurally distinguishable from prior art devices in that it embodies an elongated draft bar fashioned at one end for attachment to one vehicle, and provided with a novel releasable clamping device at the opposite end for association with the complemental vehicle, together with a practical coupler embodied in the bar construction, whereby to permit the necessary relative movement between the two vehicles to insure positive and efficient draft.

Otherwise stated, the invention is characterized by a sectional draw bar, the sections of which are connected through the medium of a flexible coupling, the short section being provided with spring-opened mechanically closed jaw elements forming a novel and feasible type of vehicle clamp.

The specific details and their relative arrangement and association will become more readily apparent from the following description and drawings.

In the drawings:

Figure 1 is an elevational view of a draft device constructed in accordance with the present invention.

Figure 2 is a top plan view thereof.

Figure 3 is a view in section and elevation detailing the flexible coupler.

Figure 4 is an end view of the structure seen in Figure 3, observing it in a direction from right to left.

Figure 5 is an exaggerated detail view showing the clamp construction.

Figure 6 is a top plan view of the structure seen in Figure 5.

Figure 7 is a detail view of one of the clamping jaws.

In Figure 1, for example, the numeral 8 designates as a whole, the draw bar. This comprises a forward section 9 of tubular form and of appropriate configuration and proportion. This is joined to the relatively short rear section 10 through the medium of a flexible coupler generally designated by the numeral 11. The right hand end of the draw bar is offset and flattened and apertured as indicated at 12 to permit it to be pinned or otherwise connected with the lead vehicle for example.

The relatively short section 10 as observed better in Figure 3, is provided with the vehicle clamping device 13. This section 10 embodies a relatively short bar member having a head at the inner end made up of radial attaching arms 14. On the opposite end is a clamp, and in this connection I invite attention to Figure 5, wherein it will be observed that the numeral 15 designates a depending screw-threaded stud carrying a clamping and cam forming nut 16, held against accidental displacement by the cotter key 17.

The rounded peripheral edge portion of this collar nut 16 engages the curvate cam enlargement or surfaces 18 of the duplicate jaws 19. These jaws are pivotally mounted adjacent their lower ends on the bar section 10 and located on opposite sides of the stud 15. The upper ends of the jaws are directed inwardly toward each other and terminate in knob-like heads or enlargements 20, to facilitate engagement with the axle or other part of the complemental vehicle (not shown).

The numeral 21 designates a coiled spring mounted as shown in this figure and cooperating in its opposite ends with the jaws at a point above the pivotal mounting so as to normally move the jaws away from each other at their upper ends. This serves to spread the jaws apart when the nut 16 is loosened. However, by tightening the nut, it is obvious that the knob-equipped ends of the jaws are brought together in close relation so as to permit them to firmly and efficiently embrace the parts of the vehicle to which they are connected.

The gist of the situation here is the provision of a dependable, simplified and economical clamp, susceptible of being readily engaged with the adjacent vehicle.

Attention being confined at this time to Figure 3, it will be observed that the numeral 22 represents the centralized stud of a specially designed fitting forming a part of the coupler. This is telescopically fitted in the adjacent tubular end of the front rod section 9.

The radial arms 23 are arranged in staggered relation with respect to the similarly shaped arms 14 and both pairs of arms are secured by bolts 24 to a series of connecting rings 25. These rings are of suitable texture of rubberized fabric or the like to provide tough connecting members between the members 14 and 23, and to permit the front and rear sections of the drawbars to have relative flexible motion with respect to each other.

Thus, I provide a novel and dependable coupler between the companion sections of the complete drawbar. Briefly then, the draw bar is made up of a long front section and a short rear section, the latter being provided with a quick separable clamping device to facilitate connection thereof to the adjacent vehicle. The long section is constructed at its free end to permit it to be effectively connected with the remaining vehicle.

The two sections being coupled together through the medium of a flexible coupling device have relative variable movement such as is so necessary to accommodate the undeterminable relative movement between the two vehicles as they move along as a unit.

It is thought that persons skilled in the art to which the invention relates will be able to obtain a clear understanding of the invention after considering the description in connection with the drawings. Therefore a more lengthly description is regarded as unnecessary.

Minor changes in shape, size, and rearrangement of details coming within the field of invention claimed may be resorted to in actual practice if desired.

I claim:

1. In a draft appliance of the class described, a draw bar, and means for detachably connecting one end thereof to an adjacent vehicle, comprising a pair of duplicate jaws having their upper ends curved toward each other and terminating in knob-like extensions, means pivotally mounting said jaws at a point intermediate their opposite ends, the end portions of the jaws adjacent the pivotal mountings being curved to form complemental cams, a relatively rigid screw-threaded stud on the bar between said cam ends, and a nut having a cam surface, said nut being threaded on said stud and having its surface arranged for co-operation with said cams.

2. In a device of the class described, in combination, a draw bar, a depending screw-threaded stud at one end, a pair of complemental clamping jaws pivotally mounted on opposite sides of said stud, the lower end portions of the jaws being enlarged and formed with curvate surfaces providing cams, the upper ends of the jaws being curved toward each other and having knob-like terminals, a spring mounted in said stud and having its opposite ends engaging the jaws at a point above the pivotal connections whereby to move the knob equipped ends away from each other, and a feed and retaining nut threaded on said stud and having a curved peripheral portion co-operating with said cams.

In testimony whereof I affix my signature.

PERLE LEE HOLLOWAY.